United States Patent
Sabag et al.

(10) Patent No.: US 10,296,449 B2
(45) Date of Patent: May 21, 2019

(54) RECORDING AN APPLICATION TEST

(71) Applicant: HEWLETT PACKARD ENTERPRISE DEVELOPMENT LP, Houston, TX (US)

(72) Inventors: Yehuda Sabag, Yehud (IL); Svetlana Aronov, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 34 days.

(21) Appl. No.: 15/028,758

(22) PCT Filed: Oct. 30, 2013

(86) PCT No.: PCT/US2013/067480
§ 371 (c)(1),
(2) Date: Apr. 12, 2016

(87) PCT Pub. No.: WO2015/065364
PCT Pub. Date: May 7, 2015

(65) Prior Publication Data
US 2016/0246708 A1    Aug. 25, 2016

(51) Int. Cl.
*G06F 11/34*    (2006.01)
*G06F 9/44*    (2018.01)
(Continued)

(52) U.S. Cl.
CPC ........ *G06F 11/3692* (2013.01); *G06F 11/364* (2013.01); *G06F 11/3664* (2013.01);
(Continued)

(58) Field of Classification Search
CPC ............. G06F 11/3476; G06F 11/3688; G06F 11/3676; G06F 11/2273; G06F 11/3447; G06F 11/3684; G06F 11/3414; G06F 11/366; G06F 11/3604; G06F 11/3672; G06F 11/362; G06F 11/36; G06F 11/006; G06F 11/3668; G06F 11/3495;
(Continued)

(56) References Cited

U.S. PATENT DOCUMENTS

| 5,157,782 | A | * | 10/1992 | Tuttle | ........... G06F 11/3688 714/25 |
| 5,218,605 | A | * | 6/1993 | Low | .............. G06F 11/2273 714/45 |

(Continued)

OTHER PUBLICATIONS

Omar El Ariss et al., A Systematic Capture and Replay Strategy for Testing Complex GUI based Java Applications, 2010, [Retrieved on Feb. 15, 2019]. Retrieved from the internet: <URL: https://ieeexplore.ieee.org/stamp/stamp.jsp?tp=&arnumber=5501494> 6 Pages (1038-1043) (Year: 2010).*

(Continued)

*Primary Examiner* — Anibal Rivera (57) ABSTRACT

Recording an application test can include creating a number of recordings that define a number of interactions with an application under test (AUT), wherein the number of recordings are created serially. Recording an application test can include replaying each of the number of recordings while the number of recordings are being created to determine an outcome of a test. Recording an application test can include analyzing and reporting the outcome of the test.

20 Claims, 6 Drawing Sheets

(51) Int. Cl.
  *G06F 11/36* (2006.01)
  *G06F 17/30* (2006.01)
  *G06F 11/22* (2006.01)

(52) U.S. Cl.
  CPC ...... *G06F 11/3688* (2013.01); *G06F 11/2273* (2013.01); *G06F 11/34* (2013.01); *G06F 11/3414* (2013.01); *G06F 11/3476* (2013.01)

(58) Field of Classification Search
  CPC .............. G06F 11/3006; G06F 11/3419; G06F 11/323; G06F 9/4443; G06F 9/45516; G06F 9/45512; G06F 9/4448; G06F 17/24; G06F 17/30368; G06F 8/24; G06F 17/30873; G06F 11/263; G06F 11/3664
  See application file for complete search history.

(56) References Cited

U.S. PATENT DOCUMENTS

| | | | | |
|---|---|---|---|---|
| 5,448,739 A * | 9/1995 | Jacobson | G06F 9/45512 | 345/440 |
| 5,483,468 A | 1/1996 | Chen et al. | | |
| 6,421,793 B1 * | 7/2002 | Lester | G06F 11/2733 | 714/37 |
| 6,449,739 B1 * | 9/2002 | Landan | G06F 11/323 | 709/224 |
| 6,477,483 B1 * | 11/2002 | Scarlat | G06F 11/3414 | 702/186 |
| 6,502,102 B1 * | 12/2002 | Haswell | G06F 11/3664 | |
| 6,701,514 B1 * | 3/2004 | Haswell | G06F 11/3664 | 707/999.102 |
| 6,792,460 B2 * | 9/2004 | Oulu | G06F 11/3495 | 709/224 |
| 6,907,546 B1 * | 6/2005 | Haswell | G06F 11/3684 | 714/38.11 |
| 6,978,218 B1 * | 12/2005 | Kolb | G06F 11/3688 | 702/121 |
| 7,107,174 B2 * | 9/2006 | McGrath | G06F 11/3672 | 370/254 |
| 7,552,424 B1 * | 6/2009 | Bischof | G06F 11/006 | 714/36 |
| 7,653,896 B2 * | 1/2010 | Herdeg, III | G06F 9/45512 | 715/704 |
| 7,673,292 B2 | 3/2010 | Vikram | | |
| 7,877,681 B2 * | 1/2011 | Schwarzbauer | G06F 11/36 | 715/234 |
| 8,239,826 B2 * | 8/2012 | Elenburg | G06F 11/3414 | 717/110 |
| 8,271,962 B2 * | 9/2012 | Muller | G06F 17/271 | 717/134 |
| 8,291,068 B2 * | 10/2012 | Kraus | H04L 43/08 | 703/15 |
| 8,370,841 B2 | 2/2013 | Subhraveti et al. | | |
| 8,402,318 B2 * | 3/2013 | Nieh | G06F 11/3419 | 714/15 |
| 8,473,919 B2 * | 6/2013 | Cutler | G06F 11/366 | 717/124 |
| 8,516,451 B2 * | 8/2013 | Tendler | G06F 8/24 | 717/106 |
| 8,522,219 B2 | 8/2013 | Schwarzbauer et al. | | |
| 8,572,568 B2 | 10/2013 | Giat | | |
| 8,621,486 B2 * | 12/2013 | Schwartz | G06F 11/3668 | 719/318 |
| 8,677,324 B2 * | 3/2014 | Markuza | G06F 11/3414 | 717/124 |
| 8,966,448 B2 * | 2/2015 | Cooper | G06F 11/362 | 717/124 |
| 9,129,058 B2 * | 9/2015 | Cui | G06F 11/3466 | |
| 9,684,750 B1 * | 6/2017 | Bernard | G06F 17/5045 | |
| 9,721,052 B1 * | 8/2017 | Bernard | G06F 17/5068 | |
| 2002/0198984 A1 * | 12/2002 | Goldstein | G06F 11/323 | 709/224 |
| 2002/0198985 A1 * | 12/2002 | Fraenkel | G06F 11/3409 | 709/224 |
| 2003/0005044 A1 * | 1/2003 | Miller | H04L 43/50 | 709/203 |
| 2003/0065986 A1 * | 4/2003 | Fraenkel | G06F 11/3006 | 714/47.2 |
| 2004/0015600 A1 | 1/2004 | Tiwary et al. | | |
| 2004/0054715 A1 * | 3/2004 | Cesario | G06F 11/3414 | 709/203 |
| 2004/0059809 A1 * | 3/2004 | Benedikt | G06F 17/30864 | 709/224 |
| 2004/0100502 A1 * | 5/2004 | Ren | G06F 9/451 | 715/802 |
| 2004/0111727 A1 * | 6/2004 | Schwarzbauer | G06F 11/36 | 719/310 |
| 2004/0172253 A1 * | 9/2004 | Singh | G06F 11/3414 | 704/270.1 |
| 2004/0194054 A1 * | 9/2004 | McGrath | G06F 11/3672 | 717/100 |
| 2005/0010904 A1 * | 1/2005 | Morioka | H04N 5/76 | 717/120 |
| 2005/0138646 A1 * | 6/2005 | Mese | G06F 9/451 | 719/328 |
| 2006/0101404 A1 * | 5/2006 | Popp | G06F 11/3688 | 717/124 |
| 2006/0101476 A1 | 5/2006 | Robert | | |
| 2006/0156287 A1 * | 7/2006 | Vikram | G06F 11/3684 | 717/124 |
| 2006/0253742 A1 * | 11/2006 | Elenburg | G06F 11/3414 | 714/38.14 |
| 2007/0022406 A1 * | 1/2007 | Liu | G06F 9/451 | 717/124 |
| 2007/0240118 A1 * | 10/2007 | Keren | G06F 11/3684 | 717/124 |
| 2008/0082629 A1 * | 4/2008 | Puthiyaveettil | G06F 17/30873 | 709/217 |
| 2008/0141221 A1 * | 6/2008 | Benesovska | G06F 9/45512 | 717/124 |
| 2008/0177525 A1 * | 7/2008 | Crawford | G06F 11/3664 | 703/22 |
| 2008/0222610 A1 * | 9/2008 | Joshi | G06F 11/3688 | 717/126 |
| 2008/0270836 A1 * | 10/2008 | Kallakuri | G06F 11/3676 | 714/37 |
| 2008/0320462 A1 * | 12/2008 | Bergman | G06F 9/45512 | 717/168 |
| 2009/0089404 A1 * | 4/2009 | Guo | G06F 17/30873 | 709/219 |
| 2009/0100345 A1 * | 4/2009 | Miller | G06F 11/3688 | 715/738 |
| 2009/0103769 A1 * | 4/2009 | Milov | G06F 9/45512 | 382/100 |
| 2009/0249216 A1 * | 10/2009 | Charka | G06F 11/3688 | 715/744 |
| 2009/0313603 A1 * | 12/2009 | Tendler | G06F 8/24 | 717/116 |
| 2010/0095161 A1 * | 4/2010 | Giat | G06F 11/3688 | 714/45 |
| 2010/0095265 A1 * | 4/2010 | Ewing | G06F 17/30368 | 717/100 |
| 2010/0153780 A1 * | 6/2010 | Kirtkow | G06F 11/3684 | 714/37 |
| 2010/0162050 A1 * | 6/2010 | Cathro | G06F 11/3476 | 714/44 |
| 2010/0229155 A1 * | 9/2010 | Adiyapatham | G06F 11/3672 | 717/124 |
| 2010/0318970 A1 * | 12/2010 | Grechanik | G06F 11/3672 | 717/124 |
| 2011/0016356 A1 * | 1/2011 | Artzi | G06F 11/3672 | 714/38.1 |
| 2011/0016456 A1 * | 1/2011 | Artzi | G06F 11/3684 | 717/131 |
| 2011/0016457 A1 * | 1/2011 | Artzi | G06F 11/3684 | 717/131 |
| 2011/0022899 A1 * | 1/2011 | Greenberg | G06F 11/3414 | 714/32 |

(56) References Cited

U.S. PATENT DOCUMENTS

| | | | | |
|---|---|---|---|---|
| 2011/0030061 A1* | 2/2011 | Artzi | G06F 11/3604 | 726/25 |
| 2011/0131551 A1* | 6/2011 | Amichai | G06F 11/3668 | 717/125 |
| 2011/0173589 A1* | 7/2011 | Guttman | H04L 43/50 | 717/125 |
| 2011/0191676 A1* | 8/2011 | Guttman | G06F 3/00 | 715/716 |
| 2011/0276944 A1* | 11/2011 | Bergman | G06F 11/3684 | 717/124 |
| 2011/0307799 A1* | 12/2011 | Aronov | G06F 11/3688 | 715/744 |
| 2011/0320880 A1* | 12/2011 | Wenig | G06F 11/3414 | 714/39 |
| 2012/0005689 A1* | 1/2012 | Schwartz | G06F 11/3668 | 719/318 |
| 2012/0096010 A1* | 4/2012 | Schwartz | G06F 17/30607 | 707/748 |
| 2012/0140081 A1* | 6/2012 | Clements | H04N 17/004 | 348/181 |
| 2012/0185823 A1* | 7/2012 | Monza | G06F 9/45516 | 717/115 |
| 2012/0198476 A1* | 8/2012 | Markuza | G06F 11/3414 | 719/318 |
| 2012/0221519 A1* | 8/2012 | Papadomanolakis | G06F 11/3688 | 707/615 |
| 2013/0097586 A1* | 4/2013 | Chandra | G06F 11/3684 | 717/124 |
| 2013/0198333 A1* | 8/2013 | Nakamura | H04L 29/0809 | 709/217 |
| 2013/0219220 A1* | 8/2013 | Kraus | G06F 11/263 | 714/32 |
| 2013/0318499 A1* | 11/2013 | Hemed | G06F 11/3447 | 717/124 |
| 2014/0089904 A1* | 3/2014 | Wray | G06F 11/3672 | 717/135 |
| 2014/0101640 A1* | 4/2014 | Romdhane | G06F 11/3684 | 717/125 |
| 2014/0181793 A1* | 6/2014 | Kaliappan | G06F 11/3684 | 717/124 |
| 2014/0237293 A1* | 8/2014 | Cui | G06F 11/3466 | 714/37 |
| 2014/0317602 A1* | 10/2014 | Zuo | G06F 11/362 | 717/125 |
| 2015/0199255 A1* | 7/2015 | Luo | G06F 11/3688 | 717/124 |
| 2015/0205882 A1* | 7/2015 | Vukas | G06F 17/30899 | 707/758 |
| 2016/0217058 A1* | 7/2016 | Kidron | G06F 9/543 | |
| 2016/0266730 A1* | 9/2016 | Franke | G06F 17/30873 | |
| 2016/0301732 A1* | 10/2016 | Moretto | H04L 43/50 | |
| 2017/0075738 A1* | 3/2017 | Han | H04L 67/10 | |

OTHER PUBLICATIONS

Sara Sprenkle et al., Automated Replay and Failure Detection for Web Applications, Nov. 7-11, 2005, [Retrieved on Feb. 15, 2019]. Retrieved from the internet: <URL: https://userpages.umbc.edu/~sampath/papers/sprenkle.ase05.pdf> 10 Pages (1-10) (Year: 2005).*

International Search Report & Written Opinion received in PCT Application No. PCT/US2013/067480, dated Jun. 27, 2014, 10 pages.

Lee, D. et al., "Respec: Efficient Online Multiprocessor Replay via Speculation and External Determinism," Mar. 13-17, 2010, 13 pages, available at http://web.eecs.umich.edu/~nsatish/papers/ASPLOS-10-Respec.pdf.

* cited by examiner

RECORDING AN APPLICATION TEST

CROSS-REFERENCE TO RELATED APPLICATION

This application is a U.S. National Stage Application of and claims priority to international Patent Application No. PCT/US2013/067480, filed on Oct. 30, 2013, and entitled "RECORDING AN APPLICATION TEST," the entire content of which is hereby incorporated in its entirety.

BACKGROUND

Application programs, including web-based applications such as web pages, and the hardware associated with the applications, are often tested under extreme use conditions. Such conditions may be provided by a system that simulates a number of users simultaneously executing the application. A user may be simulated by execution of a program, for example a previously acquired script that provides appropriate user inputs and responses to exercise the application. A script acquisition system vets user actions to determine which are to be included in a script.

DETAILED DESCRIPTION

A workflow for testing an application can include a record phase, a development phase, a replay phase, and an analysis phase. In a number of examples, a record phase can be performed concurrently with a replay phase and a development phase can be performed concurrently with the replay phase to reduce a time associated with performing the workflow.

In a number of examples, a workflow can create a script that can be used to test an application. That is, a record phase can create the script, the replay phase can execute the script to determine whether the script functions as expected, and the development phase can identify scripts that do not function as expected and provide solutions to the scripts. The scripts can then be used to test an application.

In a number of previous approaches, a workflow for testing an application can include a record phase, a replay phase, an analysis phase, and a development phase. The phases are performed serially. For example, the record phase may begin and end before the replay phase can begin, the replay phase begin and end before an analysis phase can begin, and the analysis phase can begin and end before a development phase can begin. A time associated with a workflow may be the sum of the times associated with performing the record phase, the development phase, the replay phase, and the analysis phase. For example, if a record phase takes five units of time to complete, a development phase takes two units of time, a replay phase takes five units of time, and an analysis phase takes three units of time, then a workflow can be completed in fifteen units of time. A unit of time can be seconds, minutes, and/or hours, among other units of time.

In a number of examples of the present disclosure, the record phase and the replay phase can be executed at a same time to reduce the time needed to perform the record phase, the development phase, the replay phase, and/or the analysis phase. The development phase and the replay phase can be executed at a same time to reduce the time needed to perform the record phase, the development phase, the replay phases, and/or the analysis phase.

For example, a workflow can be completed in less time than the sum of the times associated with the record phase, the replay phase, the analysis phase, and the development phase. If a record phase takes five units of time to complete, a development phase two units of time, a replay phase takes five units of time, and an analysis phase takes three units of time, then, in a number of examples, the workflow can be completed in less than fifteen units of time. The time associated with the completion of the workflow can be reduced by concurrently executing the record phase with the replay phase and by concurrently executing the development phase with the replay phase.

In a number of examples, a workflow can be completed in less time than the sum of the times associated with the record phase, the development phase, the replay phase, and the analysis phase by reducing the time associated with a replay phase. A time associated with the completion of the replay phase can be reduced by replaying a number of portions of a test simultaneously on a number of different platforms.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
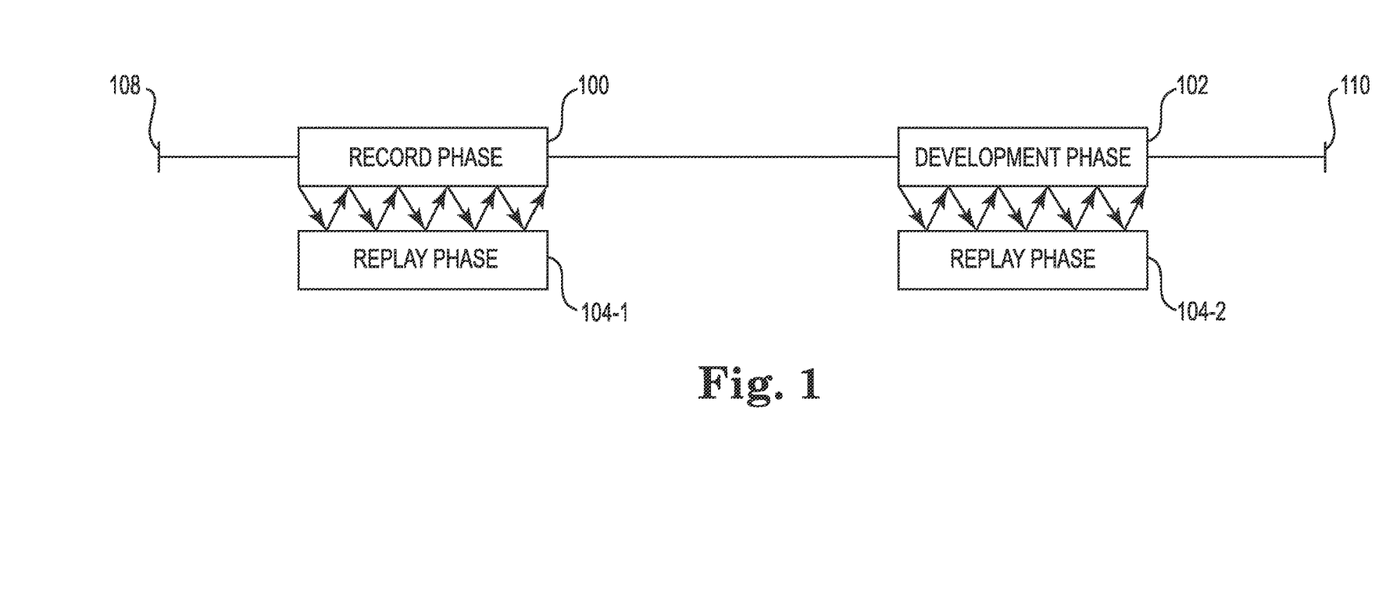
FIG. 1 illustrates a block diagram of an example of recording an application test according to the present disclosure.

FIG. 1 illustrates a block diagram of an example of recording an application test according to the present disclosure. FIG. 1 includes a record phase 100, a development phase 102, a replay phase 104-1, and a replay phase 104-2.

FIG. 1 includes a beginning time 108 and an ending time 110. The lines connecting the record phase 100 and the development phase 102 represent a timeline that is associated with the time needed to execute the record phase 100, the development phase 102, the replay phases 104-1, and/or the replay phase 104-2. That is, a record phase 100 can be executed in time before a development phase 102 and a record phase 100 can be executed concurrently with a replay phase 104-1.

In the record phase 100 an IT personnel, e.g., test developer, can record a number of interactions with an application under test (AUT). An application can consist of instructions executable by a computing device to perform a number of functions. The application can be a combination of software and/or hardware. The application can include a single application or a number of applications that depend on each other. The application can be a Web based application and/or a desktop based application. The application can be executed on a single computing device and/or a number of computing devices.

In a number of examples, an application can consist of a graphical user interface (GUI) and/or a logic unit. The GUI can receive user interactions and forward the interactions to the logic unit. The logic unit can execute a number of instructions based on the received interactions. The GUI can display a representation of the execution of the number of interactions to a user. In a number of examples, the application can be tested by interacting with the GUI and/or with a logic unit. For example, a test developer can interact with a GUI and/or the logic unit to test the application.

In a number of examples, the output of the record phase can be a generic script, e.g., native script. As used herein, a script, e.g., generic script and/or enhanced script, can include machine executable instructions and/or hardware that can be executed to perform a number of tests on an application. An enhanced script is a generic script that has been enhanced.

The generic script can be, for example, a representation of a test developer's interactions with the application. The generic script can be used to duplicate the test developer's interactions with the application without requiring that the test developer physically perform the interactions. For example, a test developer can physically interact once with an application via a computing device to create a generic script. The generic script can then be used, without the test developer providing further interactions, to duplicate the developer's interactions with the Application. The generic script can be used repetitively.

An interaction with an application can include performing a function associated with an application. For example, an interaction can include providing a user name and a password to the application as part of an identification verification process, selecting a link that is presented through a GUI, and/or other examples of an interaction with an application. A record phase 100 is further defined with regards to FIG. 2.

Figure 2:
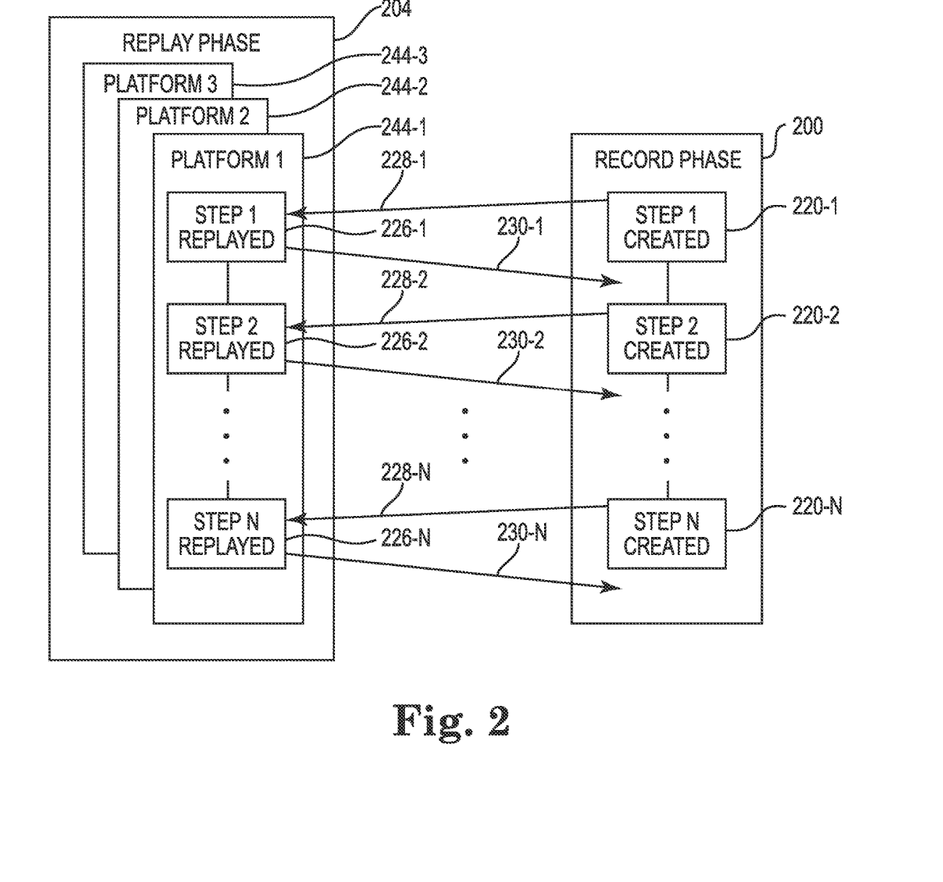
FIG. 2 illustrates a block diagram of an example of a replay phase according to the present disclosure.
Figure 3:
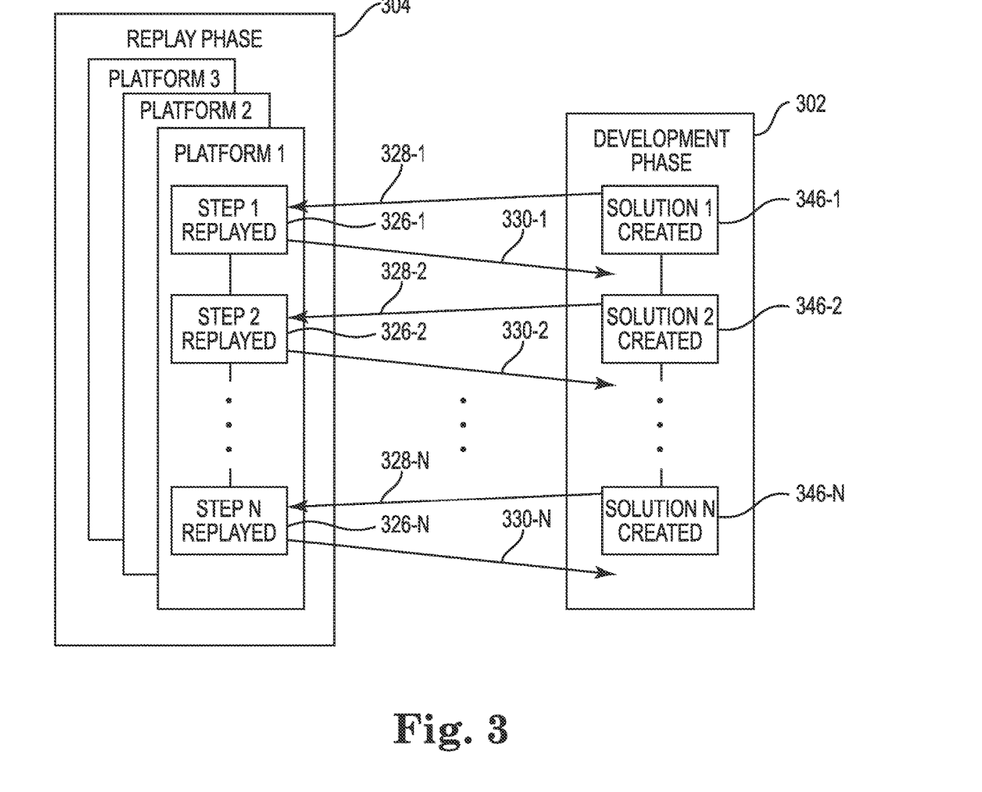
FIG. 3 illustrates a block diagram of an example of a development phase according to the present disclosure.

The replay phase 104-1 and the replay phase 104-2, e.g., referred to generally as replay phases 104, can execute a generic script and/or an enhanced script while gathering information regarding the AUT. For example, the replay phase 104-1 can execute a number of generic scripts on a number of different computing devices concurrently. FIG. 2 and FIG. 3 further explain the replay phase 104-1 and the replay phase 104-2.

In the development phase 102 the generic script created by the record phase 100 can be enhanced. The enhancements can include parameterizations, correlations, and/or enhanced development. For example, enhancements can include simulating different input scenarios, adopting the script to different platforms, and/or adding flow logic, e.g., repeating an if/then condition, to the script execution. An enhancement to the generic script that simulates different users can include creating a number of different user accounts to allow the generic script to be executed using the number of different user accounts. An enhancement of different test scenarios can include providing the generic script with variations of the parameter that is used by the script. For example, the generic script can enter text into a text field. The entered text, e.g., "Hello World", can be a parameter. Variations of the parameter can include integrating numbers, e.g., "Hello World 1234", symbols, e.g., "Hello World !@#$", and/or punctuation marks, e.g., "Hello World ,.;" with the text. In a number of examples, the parameter can be replaced with different text. For example, the parameter "Hello World" can be replaced by "ABCDEFG."

The generic script can be enhanced to simulate the use of the application on different platforms by modifying the syntax used by the generic script to interact with an operating system, website, and/or a different application, among other targets with which the generic script can interact. For example, a generic script that navigates to a website, using a first browser, can use a first number of commands. An enhanced script that navigates to the website, using a second browser, can use a second number of commands. That is, the generic script can be enhanced by substituting the first number commands with the second number of commands that perform the same functions as the first number of system calls but on the second browser.

Enhancing a generic script can result in the creation of an enhanced script and/or the creation of a number of enhanced scripts. For example, the enhancement of a generic script can result in an enhanced script that includes syntax to interact with three different browsers or can result in a number of enhanced scripts each of which includes syntax to interact with one of the three browsers. In a number of examples, the development phase 102 can be performed by a test developer and/or automatically based on a number of rules.

During the analysis phase gathered information is analyzed to determine whether the generic script and/or enhanced script performed as expected, e.g., passed a replay phase. The analysis phase can begin after a record phase 100, after a replay phase 104-1, before a development phase 102, and/or after a replay phase 104-2.

The analysis phase can include reporting the results of the replay phase 104-1 to a test developer. For example, a result of the replay phase can be reported, in the analysis phase, to the test developer via a computing device and/or a number of computing devices. A report can include an expected performance of the script as executed on the application, the actual performance of the script as executed on the application, an interpretation, e.g., a failed or passed test status, of the actual performance of the script as executed on the application, a number of suggestions for possible modifications, e.g., corrections, to the script that can be made to change the behavior of the executed script. The report can be used by the test developer to understand a script problem.

A test developer can make a number of modifications, at a development phase 102, to the generic script and/or enhanced script when the application fails a test. The test developer can re-record a number of interactions with the application to create a number of generic scripts and/or can reuse the previously created generic scripts during a development phase 102 after a number of modifications have been made to the generic script. The application can be re-tested by concurrently executing the development phase 102 and the replay phase 104-2. The development phase 102 and the replay phase 104-2 can be executed a number of times based on the number of times that a generic script and/or an enhanced script is executed on the application.

In a number of examples, the record phase 100 and the replay phase 104-1 can be executed at a same time to reduce the time needed to perform the record phase 100, the development phase 102, the replay phases 104, and/or the analysis phase. The development phase 102 and the replay phase 104-2 can be executed at a same time to reduce the time needed to perform the record phase 100, the development phase 102, the replay phases 104, and/or the analysis phase.

A number of phases can be performed at a same time by executing a first phase and a second phase concurrently. For example, the record phase 100 can be executed concurrently with the replay phase 104-1, for example, when execution of the replay phase 104-1 begins before execution of the record phase 100 ends. The development phase 102 can be executed concurrently with the replay phase 104-2, for example, when execution of the replay phase 104-2 begins before execution of the development phase 102 ends.

Concurrently executing a number of the phases can reduce the time that is takes to execute the number of phases as compared to executing the number of phases serially. FIGS. 2 and 3 further define the concurrent execution of a number of phases.

In a number of examples, the record phase 100, the development phase 102, the replay phases 104, and/or the analysis phase can be executed on different computing devices. For example, the record phase 100 can be executed on a first computing device. The development phase 102 can be executed on a second computing device. The replay phase 104-1 and the replay phase 104-2 can be executed on a third computing device and a fourth computing device, respectively, or the replay phase 104-1 and the replay phase 104-2 can be executed on the third computing device. The analysis phase can be executed on a fifth computing device. In a number of examples, the record phase 100, the development phases 102, the replay phases 104, the analysis phase can be executed on a same computing device.

FIG. 2 illustrates a block diagram of an example of a replay phase according to the present disclosure. FIG. 2 shows a record phase 200 that is analogous to record phase 100 in FIG. 1 and a replay phase 204 that is analogous to replay phase 104-1 in FIG. 1.

A generic script created by the record phase 200 can be divided into a number of portions. For example, a generic script can be divided into a number of portions by step 220-1, step 220-2, . . . , and step 220-N, e.g., referred to generally as steps 220, among other steps. Each of the steps 220 can create and/or divide a portion of the generic script. For example, the step 220-1 can create a first portion of the generic script, the step 220-2 can create a second portion of the generic script, . . . , a step 220-N can create an N portion of the generic script. Each of the steps can be defined automatically by a number of rules and/or by the test developer.

The test developer, while making a recording, can indicate a beginning of a step 220-1 and an end of step 220-1. For example, the test developer can indicate through a GUI the beginning of step 220-1 and/or the end of step 220-1. In a number of examples, the GUI through which the test developer indicates the beginning of step 220-1 and/or the end of step 220-1 can be a same GUI that is associated with the AUT and/or a different GUI that is associated with software used to execute the record phase 200 and/or make the generic script. The test developer can also indicate a beginning of step 220-2, . . . , and/or step 220-N and/or the end of step 220-2, . . . , and/or step 220-N.

The basic script and/or enhanced script can be divided into portions by a script execution engine. In a number of examples, the script execution engine can divided a script into portions using logic. For example, the script execution engine can associate a number of logical rules that can divide a script into portions.

In a number of examples, the number of portions of the generic script can be sent to and/or received at the replay phase 204. For example, step 220-1 can create a portion 228-1 of a generic script that can be sent to the replay phase 204, step 220-2 can create a portion 228-2 of the generic script that can be sent to the replay phase 204, . . . , the step 220-N can create a portion 228-N of the generic script that can be sent to the replay phase 204, e.g., referred to generally as portions 228 of a generic script. The portions 228 can collectively define the generic script.

In a number of examples, the steps 220 can create a number of generic scripts. For example, a first generic script created by step 220-1 can be independent from a second generic script created by step 220-2. The number of generic scripts can be enhanced at a development phase to create a number of enhanced scripts.

In a number of examples, a replay phase 204 can begin at the same time that a record phase 200 begins or after the step 220-1 is created. A replay phase 204 can include a step replay 226-1, a step replay 226-2, . . . , and a step replay 226-N, e.g., referred to generally as step replays 226. The step replays 226 can be associated with the steps 220. For example, the step replay 226-1 can be associated with the step 220-1.

The step replay 226-1 can replay, e.g., execute, a portion 228-1 of the generic script that was created by step 220-1. The step replay 226-1 can begin after the step 220-1 is created, the step replay 226-2 can begin after the step 220-2 is created, . . . , the step replay 226-N can begin after the step replay 220-N is created. In a number of examples, the step replay 226-1 can be executed at a same time that a step 220-2 is being created by the test developer and/or by the record phase 200. That is, the step replay 226-1 can be executed concurrently with the creation of step 220-2. The step replay 226-2 can be executed at a same time that a step 220-3 is being created by the test developer, . . . , and/or the step replay 226-N–1 can be executed at a same time that a step 220-N is being created by the test developer. The step replays 226 can be executed concurrently with the creation of the steps 220. For example, the step replay 226-1 can be executed at a same time that a step 220-3 is being created by the test developer.

An analysis phase can analyze information gathered during the step replays 226. For example, the analysis phase can analyze an application's behavior as a result of the execution of the script. The behavior of the application can be used to determine whether a test that is associated with the step replay 226-1 passed or failed.

A failed test can indicate a problem that is associated with the generic script. For example, if a step replay 226-1 replays a portion 228-1 of a generic script that provides a username and a password to an application, then a test that determines whether the script functions properly can fail if the application denies the username and password. The analysis phase can determine that a test failure occurred, the source of the failure, and/or a solution for the failure.

The analysis phase can produce a report that includes the status of the test. The report can also include, in cases of a test failure, the test failure, the source of the failure, and/or a solution to resolve a problem associated with the failure, among other data that can be associated with the application. For example, the report 230-1 can include a status of a test that was conducted in the step replay 226-1, the report 230-2 can include a status of a test that was conducted in step replay 226-2, . . . , and/or the report 230-N can include a status of a test that was conducted in step replay 226-N, e.g., referred to generally as reports 230.

The reports 230 can be delivered to the test developer via a computing device. The test developer can receive each of the reports 230 after it is created. For example, a report 230-1 can be delivered before the step 220-2 is created, while the step 220-2 is being created, and/or after the step 220-2 is created. The reports 230 can be created concurrently with the creation of steps 220. The test developer can have immediate feedback upon completion of the creation of a generic script because the record phase 200 and the replay phase 204 can be executed concurrently with the record phase 200.

In a number of examples, the generic scripts created by the steps 220 can be enhanced to function on a number of different platforms. For example, the generic script can be enhanced to be executed on a platform 244-1, a platform 244-2, and/or a platform 244-3, e.g., referred to generally as platforms 244. The generic script can be enhanced to be executed on more or less platforms than those shown herein. A platform can be machine readable instructions and/or hardware that can be used to execute and/or assist in the execution of the generic script. For example, if the AUT is a website, then a platform can be a number of different web browsers that can be used to implement a number of enhanced scripts to test the website. The platforms 244 can be operating systems, databases, servers, and/or an application on which the AUT depends, among other examples of a platform. A number of enhanced scripts can be replayed concurrently on a number of platforms 244. The number of scripts that are replayed concurrently on the number of platforms 244 can be executed concurrently with the creation of the steps 220.

FIG. 3 illustrates a block diagram of an example of a development phase according to the present disclosure. FIG. 3 includes a development phase 302 that is analogous to development phase 102 in FIG. 1, a replay phase 304 that is analogous to replay phase 104-1 and replay phase 104-2 in FIG. 1 and replay phase 204 in FIG. 2.

In the development phase 302 a test developer can provide a number of solutions to a number of problems. For example, in the development phase 302 a solution 346-1, a solution 346-2, . . . , and a solution 246-N, e.g., referred to generally as solutions 346, can be provided. The solutions can be associated with a number of steps and/or a number of step replays. For example, a solution 346-1 can be a solution to a problem that was identified based on the report created from a step replay 226-1 in FIG. 2 that replayed a portion of a generic script created that was created from step 220-1 in FIG. 2.

The development phase 302 can create a generic script and/or an enhanced script based on the solutions 346. For example, the development phase 302 can create a portion of a generic script based on the solution 346-1. In a number of examples, the development phase 302 can create a portion 328-1 of an enhanced script based on the solution 346-1. The portion 328-1 of the enhanced script can be executed at a step replay 326-1. In a number of examples, the solutions phase 342 can reuse the generic script created by step 220-1 in FIG. 2 to test the solution 346-1 and to create a portion 328-1 of the enhanced script. The solution 346-2 can create a portion 328-2 of an enhanced script, . . . , and the solution 346-N can create a portion 328-2 of an enhanced script.

The step replays 326 can be executed concurrently with the provisioning the solutions 346. For example, a step replay 326-1 can be executed before the solution 346-2 is provided, as the solution 346-2 is being provided, and/or after the solution 346-2 has been provided.

Data can be gathered while a portion 328-1 of the enhanced script is being executed at the step replay 326-1 and provide a number of reports to the test developer via a computing device. For example, a report 330-1, a report 330-2, . . . , and a report 330-N, e.g., referred to generally as reports 330, can be provided to the test developer. The reports 330 can be provided to the developer concurrently with the creation of the solutions 346. For example, a report 330-1 can be provided to the developer before solution 346-2 is provided, while solution 346-2 is being provided, and/or after solution 346-2 has been provided. Replaying a script and providing a report concurrently with the creation of the solutions 346 can reduce the time needed to execute the development phase 302 and the replay phase 304.

The step replays 326 can be executed automatically after the test developer provides the solutions 346. For example, the step replay 326-1 can be executed automatically after the test developer provides the solution 346-1. Automatically executing the step replay 326-1 can reduce the time needed to execute the development phase 302 and the replay phase 304.

Figure 4:
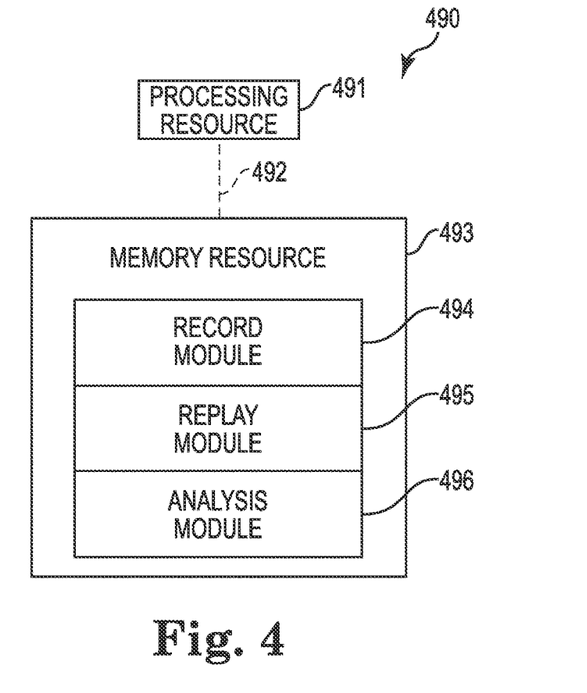
FIG. 4 illustrates a block diagram of an example of a computing device according to the present disclosure.

FIG. 4 illustrates a block diagram of an example of a computing device according to the present disclosure. The computing device 490 can utilize software, hardware, firmware, and/or logic to perform a number of functions described herein.

The computing device 490 can be any combination of hardware and program instructions configured to record an application test. The hardware, for example can include a processor resource 491 and/or a memory resource 493, e.g., machine readable medium (MRM), database, etc. A processor resource 491, as used herein, can include any number of processors capable of executing instructions stored by a memory resource 493. The processor resource 491 may be integrated in a single device or distributed across multiple devices. The program instructions, e.g., machine-readable instructions (MRI), can include instructions stored on the memory resource 493 and executable by the processor resource 491 to implement a desired function, e.g., record an application test.

The memory resource 493 can be in communication with a processor resource 491. A memory resource 493, as used herein, can include any number of memory components capable of storing instructions that can be executed by processor resource 491. Such memory resource 493 can be a non-transitory MRM. The memory resource 493 may be integrated in a single device or distributed across multiple devices. Further, the memory resource 493 may be fully or partially integrated in the same device as the processor resource 491 or it may be separate but accessible to that device and processor resource 491. Thus, it is noted that the computing device 490 may be implemented on a participant device, on a server device, on a collection of server devices, and/or on a combination of the participant device and the server device.

The memory resource 493 can be in communication with the processor resource 491 via a communication link, e.g., path, 492. The communication link 492 can be local or remote to a machine, e.g., a computing device, associated with the processor resource 491. Examples of a local communication link 492 can include an electronic bus internal to a machine, e.g., a computing device, where the memory resource 493 is one of volatile, non-volatile, fixed, and/or removable storage medium in communication with the processor resource 491 via the electronic bus.

A number of modules 494, 495, 496 can include MRI that when executed by the processor resource 491 can perform a number of functions. The number of modules 494, 495, 496 can be sub-modules of other modules. For example, the record module 494 and the replay module 495 can be sub-modules and/or contained within the same computing device. In another example, the number of modules 494, 495, 496 can comprise individual modules at separate and distinct locations, e.g., MRM, etc.

Each of the number of modules 494, 495, 496 can include instructions that when executed by the processor resource 491 can function as a corresponding engine as described herein. For example, the input module 494 can include instructions that when executed by the processor resource 491 can function as a record engine.

In the example of FIG. 4, a record module 494 can comprise MRI that are executed by the processor resource 491 to create a number of recordings that define a number of interactions with an application under test (AUT). The number of recordings can be used to create a generic script that can be used to test an application. In a number of examples, the recordings are created serially.

In a number of examples, a number of resources can be initialized. The number of resources can be used to replay of each of the number of recordings. A resource can be a computing device, a different application, a database, a web browser, and/or any other resources that can be used to replay a recording, e.g., execute a script. A resource can include machine executable instructions, e.g., software, and/or hardware that can be used to replay a recording. The number of resources can be initialized before a creation of the number of recordings and/or during the creation of the number of recordings. In a number of examples, the resources can be initialized before the number of recordings are replayed. Initializing the resources before and/or during the creation of the number of recordings can allow the number of recordings to be replayed using the resources which can allow for the recording and the replay of the recordings to be executed concurrently.

A replay module 495 can comprise MRI that are executed by the processor resource 491 to replay each of the number of recordings while the number of recordings are being created to determine an outcome of a test. The number of recordings can be replayed by executing a script that was created based on the recordings. For example, a first script, e.g., generic script and/or enhanced script, that is created based on a first recording, can be executed at a same time as a second enhanced script is being created from a second recording.

An analyze module 495 can comprise MRI that are executed by the processor resource 491 to analyze and report the outcome of the test. The analysis can be based on data gathered during a replay of the number of recordings. A report can be created based on the analysis and delivered to a test developer via a computing device.

Figure 5:
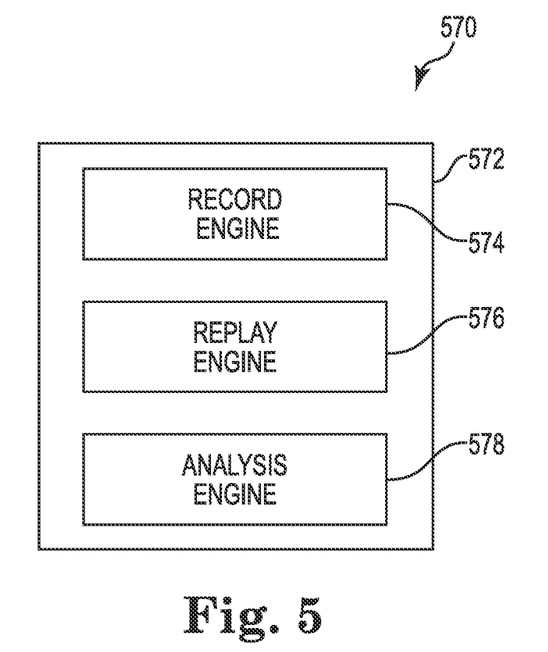
FIG. 5 illustrates a block diagram of an example of a system for recording an application test according to the present disclosure.

FIG. 5 illustrates a block diagram of an example of a system for recording an application test according to the present disclosure. The system 570 can include a computing system 572, and/or a number of engines 574, 576, 578. The computing system 572 can include the number of engines, e.g., record engine 574, replay engine 576, analyze engine 578, etc. The computing system 572 can include additional or fewer engines than illustrated to perform the various functions described herein.

The number of engines can include a combination of hardware and programming that is configured to perform a number of functions described herein, e.g., recording an application test, etc. The programming can include program instructions, e.g., software, firmware, etc., stored in a memory resource, e.g., machine readable medium, etc. as well as hard-wired program, e.g., logic.

The record engine 574 can include hardware and/or a combination of hardware and programming to create a number of recordings that define a number of interactions with an application under test (AUT). The number of recordings can be created serially. The number of interactions can be divided by a test developer and/or automatically using a script execution engine to divide a recording into a number of portions of a script.

The replay engine 576 can include hardware and/or a combination of hardware and programming to begin a concurrent replay of each of the number of recordings on a number of different platforms. The concurrent replay can begin in between a creation of the number of recordings.

The analysis engine 578 can include hardware and/or a combination of hardware and programming to analyze and report a number of outcomes of a number of portions of a test, e.g., script, that are associated with the number of recordings. The number of outcomes of the execution of a script can be reported after the concurrent replay of an associated recording and/or before a recording phase is terminated. A recording phase includes the creation of the number of recordings.

In a number of examples, conducting an analysis and reporting a result of the analysis can include recommending a solution for each of the number of portions of the test that failed. The number of recommendations can be given while the number of recordings are being created.

Figure 6:
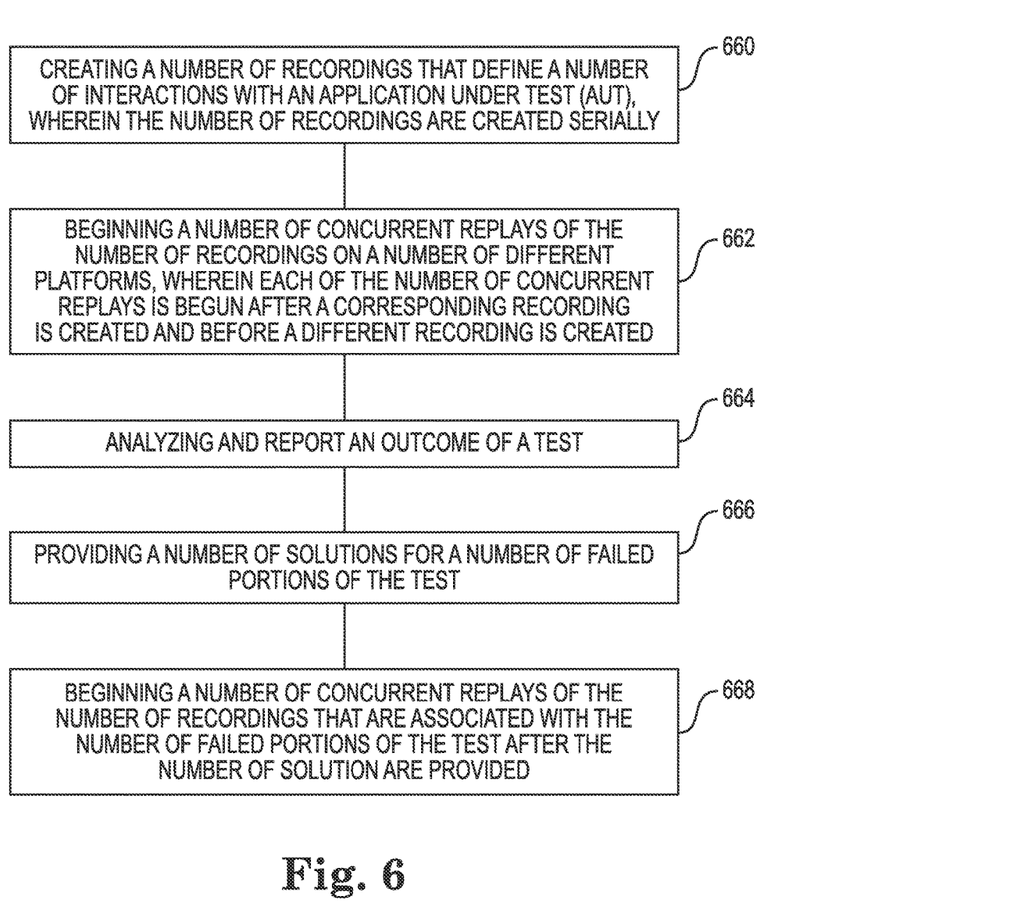
FIG. 6 illustrates a flow diagram of an example of a method for recording an application test according to the present disclosure.

FIG. 6 illustrates a flow diagram of an example of a method for recording an application test according to the present disclosure. At 660, a number of recordings that define a number of interactions with an AUT can be created. The number of recordings can be created serially.

At 662, a number of concurrent replays of the number of recordings on a number of different platforms can executed. Each of the number of concurrent replays can begin after a corresponding recording is created and before a different recording is created.

At 664, an outcome of a test can be analyzed and reported. A test developer can receive the outcome of the test via a computing device. The test developer can use the outcome of the test and an analysis of the outcome of the test to provide a solution for a problem that may be associated with a failed test. At 666, a number of solutions for a number of failed portions of the test can be provided. The number of solutions can be provided serially.

At 668, a number of concurrent replays of the number of recordings that are associated with the number of failed portions of the test can begin after the number of solution are provided. Each of the number of concurrent replays of the number of recordings that are associated with the number of failed portions of the test can begin after a corresponding solution is provided. For example, a replay of the a recording that is associated with a first failed portion of a test can begin after a solution that addresses a problem associated with the first failed portion of the test is provide by the test developer. In a number of examples, each of the number of concurrent replays of the number of recordings that are associated with the number of failed portions of the test can begin before a solution for a different failed portion of the test is provided.

In a number of examples, beginning the number of concurrent replays of the number of recordings that are associated with the number of failed portions of the test can include hosting the number of concurrent replays and the number of different platforms on a number of different computing devices. For example, if a first replay is executed on a first platform, then a first computing device can host the execution of the first replay on the first platform while a second computing device can host the execution of a second replay on a second platform.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A non-transitory machine-readable medium storing instructions for recording an application test executable by a machine to cause the machine to:
    divide a script into portions;
    create a number of recordings corresponding to the portions of the script, wherein the number of recordings define a number of interactions with an application under test (AUT), wherein the number of recordings are created serially;
    replay each of the number of recordings, wherein to replay each of the number of recordings comprises replaying a created recording for one of the portions of the script while creating a recording for another one of the portions of the script;
    analyze information gathered during the replays of the number of recordings, including accessing an expected performance of the script and determining whether the script performed as expected; and
    report an outcome of a test based on the analysis.

2. The medium of claim 1, wherein the instructions are executable to initialize a number of resources that enable a replay of each of the number of recordings.

3. The medium of claim 2, wherein the number of resources are initialized before a creation of the number of recordings.

4. The medium of claim 2, wherein the number of recordings are initialized before the replay of the number of recordings.

5. The medium of claim 1, wherein the instructions executable to divide the script into portions include instructions to divide the script into portions based on a number of rules.

6. The medium of claim 1, wherein the instructions executable to create the number of recordings include instructions to create the number of recordings based on a number of inputs provided by a user that signal a beginning and an end for each of the number of recordings.

7. A system for recording an application test comprising a processing resource in communication with a non-transitory machine readable medium having instructions executed by the processing resource to implement:
    a script execution engine that creates a number of portions of a script using logical rules;
    a record engine that creates a number of recordings corresponding to the number of portions of the script, wherein the number of recordings define a number of interactions with an application under test (AUT), and the number of recordings are created serially;
    a replay engine that begins a concurrent replay of each of the number of recordings on a number of different platforms, wherein the concurrent replay is begun in between the creation of the number of recordings, and includes replaying a created recording for one of the portions of the script while the recording for another one of the portions of the script is created; and
    an analyze engine that analyzes and reports a number of outcomes of the number of portions of a test that are associated with the number of recordings, the analyzing including accessing an expected performance of the script and determining whether the script performed as expected.

8. The system of claim 7, including instructions to analyze and report the number of outcomes of the number of portions of the test after the concurrent replay of an associated recording.

9. The system of claim 8, including instructions to analyze and report the number of outcomes of the number of portions of the test before a recording phase is terminated wherein a recording phase includes a creation of the number of recordings.

10. The system of claim 7, including instructions to recommend a solution for each of the number of portions of the test that failed wherein a number of recommendations are given while the number of recordings are being created.

11. A method for recording an application test comprising:
    creating a number of recordings corresponding to a script, wherein the number of recordings define a number of interactions with an application under test (AUT), wherein the number of recordings are created serially;
    beginning a number of concurrent replays of the number of recordings on a number of different platforms, wherein each of the number of concurrent replays is begun after a corresponding recording is created and before a different recording is created;
    analyzing and reporting an outcome of a test based on the concurrent replays of the number of recordings, including accessing an expected performance of the script and determining whether the script performed as expected;
    providing a number of solutions for a number of failed portions of the test;
    creating a number of portions of an enhanced script based on the number of solutions; and
    beginning a number of concurrent replays of the portions of the enhanced script that are associated with the number of solutions that are provided.

12. The method of claim 11, wherein the method includes serially providing the number of solutions.

13. The method of claim 12, wherein each of the number of concurrent replays of the number of recordings that are associated with the number of failed portions of the test begins after a corresponding solution is provided.

14. The method of claim 13, wherein each of the number of concurrent replays of the number of recordings that are associated with the number of failed portions of the test begin before a solution for a different failed portion of the test is provided.

15. The method of claim 14, wherein beginning the number of concurrent replays of the number of recordings that are associated with the number of failed portions of the test includes hosting the number of concurrent replays and the number of different platforms on a number of different computing devices.

16. The method of claim 11, further comprising:
reusing the script used to create the number of recordings to create the number of portions of enhanced script.

17. The method of claim 11, wherein creating the number of recordings further comprises:
dividing the script into a number of portions based on a number of logical rules; and
creating the number of recordings from the number of portions.

18. The method of claim 17, wherein dividing the script comprises:
dividing the script into the number of portions in a number of steps.

19. The method of claim 18, further comprising:
receiving one or more of beginnings and endings of the steps from a user via a graphical user interface (GUI).

20. The method of claim 11, wherein the different platforms include one or more of operating systems, databases, servers and an application on which the AUT depends.

* * * * *